United States Patent
Uchida

(10) Patent No.: US 8,420,263 B2
(45) Date of Patent: Apr. 16, 2013

(54) ELECTRODE COLLECTOR MANUFACTURING METHOD AND MANUFACTURING APPARATUS, AND BATTERY PROVIDED WITH SAID COLLECTOR

(75) Inventor: Yozo Uchida, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 319 days.

(21) Appl. No.: 12/935,022

(22) PCT Filed: Mar. 19, 2009

(86) PCT No.: PCT/IB2009/000553
§ 371 (c)(1),
(2), (4) Date: Sep. 28, 2010

(87) PCT Pub. No.: WO2009/122247
PCT Pub. Date: Oct. 8, 2009

(65) Prior Publication Data
US 2011/0020707 A1   Jan. 27, 2011

(30) Foreign Application Priority Data
Apr. 3, 2008   (JP) ................................ 2008-096712

(51) Int. Cl.
*H01M 4/13* (2010.01)
*H01M 4/88* (2006.01)

(52) U.S. Cl.
USPC .................... 429/231.8; 429/218.1; 429/209; 502/101

(58) Field of Classification Search ............... 429/231.8, 429/218.1, 209; 502/101
See application file for complete search history.

(56) References Cited

FOREIGN PATENT DOCUMENTS

| | | |
|---|---|---|
| EP | 0 715 366 A1 | 6/1996 |
| JP | 62-274556 | 11/1987 |
| JP | 63-121265 | 5/1988 |
| JP | 5-47385 | 2/1993 |
| JP | 7-122302 | 5/1995 |
| JP | 9-45334 | 2/1997 |
| JP | 9-97625 | 4/1997 |
| JP | 11-40144 | 2/1999 |
| JP | 11-250900 | 9/1999 |
| JP | 2001-110404 | 4/2001 |
| JP | 2001-297952 | 10/2001 |
| JP | 2001-351612 | 12/2001 |

(Continued)

OTHER PUBLICATIONS

Notification of Reason(s) for Refusal for JP Appl. No. 2008-096712 dated Sep. 16, 2010.

(Continued)

*Primary Examiner* — Helen O Conley
(74) *Attorney, Agent, or Firm* — Finnegan, Henderson, Farabow, Garrett & Dunner, LLP

(57) ABSTRACT

An electrode collector manufacturing apparatus (50) includes a chamber (51), the inside of which can be reduced in pressure, a substrate retaining mechanism (55) that retains a conductive substrate (12), and a gas introducing mechanism (54) that introduces a fluorine gas and an inert gas into the chamber (51). Inside the chamber (51) are provided an etching portion (52) that etches a surface of the substrate (12), and carbon film forming portions (56*a*) and (56*b*) that form a carbon film on the surface of the etched substrate (12). The gas introducing mechanism (54) is structured to create in the chamber a mixed gas atmosphere in which the fluorine and the inert gas are mixed at a predetermined molar ratio.

10 Claims, 7 Drawing Sheets

| | FOREIGN PATENT DOCUMENTS | |
|---|---|---|
| JP | 2002-217203 | 8/2002 |
| JP | 2003-100300 | 4/2003 |
| JP | 2003-249223 | 9/2003 |
| JP | 2003-277920 | 10/2003 |
| JP | 2004-63156 | 2/2004 |
| JP | 2005-210064 | 8/2005 |
| JP | 2007-161474 | 6/2007 |
| JP | 2007-242929 | 9/2007 |

OTHER PUBLICATIONS

International Search Report in International Application No. PCT/IB2009/000553; Mailing Date: Jul. 13, 2009.
Written Opinion of the International Search Authority in International Application No. PCT/IB2009/000553; Mailing Date: Jul. 13, 2009.

ELECTRODE COLLECTOR MANUFACTURING METHOD AND MANUFACTURING APPARATUS, AND BATTERY PROVIDED WITH SAID COLLECTOR

CROSS-REFERENCE TO RELATED APPLICATIONS

This application is a national phase application of International Application No. PCT/IB2009/000553, filed Mar. 19, 2009, and claims the priority of Japanese Application No. 2008-096712, filed Apr. 3, 2008, the contents of both of which are incorporated herein by reference.

BACKGROUND OF THE INVENTION

1. Field of the Invention

The invention relates to a method of manufacturing an electrode collector used as a constituent element of a battery, and an apparatus for manufacturing that electrode collector. The invention also relates to a battery provided with that collector.

2. Description of the Related Art

The demand for lithium secondary batteries (such as a lithium-ion batteries), which charge and discharge by lithium ions moving back and forth between an anode and a cathode, as on-board power supplies for vehicles and power supplies for personal computers and mobile terminals is expected to increase due to their light weight and high output. In one typical structure of this kind of secondary battery, an electrode is provided that has a structure in which material (electrode active material) capable of irreversibly storing and releasing lithium ions is retained on a conductive member (an electrode collector). For example, a typical example of electrode active material used for the anode (i.e., anode active material) is an oxide that includes lithium and one or two or more types of transition metal elements as a component metal element (hereinafter this oxide may also be referred to as a "lithium transmission metal oxide"). Also, another typical example of an electrode collector used for the anode (i.e., anode collector) is a sheet or foil-like member of mainly aluminum or an aluminum alloy.

An anode collector made of aluminum or an aluminum alloy oxidizes easily. For example, when exposed to air, the surface of an anode collector made of aluminum or an aluminum alloy immediately oxidizes and therefore always has an oxide film. When the surface of the collector is covered by an oxide film, the oxide film acts as an insulating film (such as an insulating film having a resistivity of $1014\Omega \times cm$) so the interface resistance between the anode collector and the anode active material increases. Japanese Patent Application Publication No. 11-250900 (JP-A-11-250900), for example, describes technology for preventing the formation of such an oxide film on the surface of a collector. The technology described in JP-A-11-250900 forms an overcoat layer from highly conductive material such as carbon (e.g., a carbon overcoat layer) on a collector using an electron beam evaporation apparatus, while removing the oxide film from the surface of the collector by etching the collector (aluminum foil) surface using a sputter ion beam etching apparatus.

However, with the technology described in JP-A-11-250900, when etching the collector (aluminum foil) surface, sputter ion beam etching is performed using an ion beam of an inert gas, which reduces productivity of the electrode collector. That is, an ion beam of an inert gas has a low etching rate so etching must be performed for a long time to reliably remove the oxide film from the surface of the collector, which is undesirable from the viewpoint of productivity.

For example, according to the results of tests performed by the inventors of this application, when a plasma treatment is performed while supplying argon (Ar) gas at a flowrate of 15 ml/min with the pressure of the atmosphere being 0.1 Pa, and 200 W of sputtering power using a common sputtering apparatus when the oxide film on the aluminum foil surface is approximately 5 nm thick, it took five minutes to remove the oxide film from the aluminum foil surface and the etching rate at that time was around 1 nm/min. Upon examination by the inventors of this application, it was deduced that an etching rate of at least 20 nm/min to 40 nm/min is necessary to continuously perform the etching process in-line suitable for continuous manufacture. Therefore, with the electrode collector manufacturing apparatus according to the related art described in JP-A-11-250900, it is difficult to perform the foregoing etching process and carbon process successively in-line.

SUMMARY OF THE INVENTION

This invention thus provides an electrode collector manufacturing method by which it is possible to efficiently manufacture an electrode collector provided with a carbon film. The invention also provides an electrode collector manufacturing apparatus that can efficiently manufacture an electrode collector that is preferably used in that manufacturing method.

A first aspect of the invention relates to a method of manufacturing an electrode collector covered with a carbon film. This method includes arranging a conductive substrate in a chamber; reducing the pressure in the chamber, creating a mixed gas atmosphere of a fluorine gas and an inert gas in the chamber, and dry etching a surface of the arranged substrate in that atmosphere; and forming a carbon film on the surface of the dry etched substrate.

According to this structure, an oxide film and the like which naturally forms on the surface of the conductive substrate is first removed by etching, and then a highly conductive carbon film is formed on the surface of the substrate. As a result, an electrode collector having superior collecting performance can be manufactured. In addition, etching with a mixed gas atmosphere of fluorine gas and inert gas in the chamber increases the substrate surface etching rate (i.e., etching speed). As a result, the oxide film and the like formed on the substrate surface can be removed quickly, thereby enabling the electrode collector provided with a carbon film suitable for the purpose of the invention to be efficiently produced.

In the manufacturing method according to the first aspect, the carbon film may be made essentially of carbon, and dry etching the surface of the substrate and forming the carbon film may be performed in the same chamber. According to this structure, an electrode collector in which a carbon film is formed on the substrate can be obtained by passing the substrate through the chamber only once. As a result, productivity of the electrode collector having the carbon film can be improved even more.

In the manufacturing method according to the structure described above, a mixture ratio of the fluorine gas and the inert gas in the chamber may be adjusted such that a fluorine concentration in the carbon film obtained by forming the carbon film is no more than 15 at %.

As described above, when the etching process and the carbon film forming process are performed in the same chamber, fluorine mixes in with the obtained carbon film because the carbon film forming process is performed in a mixed gas atmosphere of fluorine gas and inert gas.

In this case as well, with the foregoing structure, an increase in the resistance of the carbon film that is caused by the fluorine being mixed in can be suppressed so a highly conductive carbon film can be formed on the substrate surface.

In the manufacturing method according to the structure described above, a ratio of the fluorine gas in the mixed gas atmosphere in the chamber may be adjusted so as to be in a range between 1 mol % and 15 mol %, inclusive. According to this structure, the fluorine concentration in the carbon film can easily be adjusted so that it is no more than 15 at %.

In the manufacturing method according to the structure described above, the mixture ratio of the fluorine gas and the inert gas in the chamber may be adjusted such that the fluorine concentration in the carbon film obtained by forming the carbon film is no more than 10 at %. Also, the ratio of the fluorine gas in the mixed gas atmosphere in the chamber may be adjusted so as to be no less than 2 mol %.

In the manufacturing method according to the structure described above, the fluorine gas may be one or more types of gas selected from the group consisting of CF4, SF6, and CHF3. According to this structure, a fluorine gas such as CF4 produces an extremely active species so a high etching rate can be realized.

In the manufacturing method according to the structure described above, forming the carbon film may be performed by depositing, via physical vapor deposition or chemical vapor deposition, carbon on the substrate.

In the manufacturing method according to the structure described above, the conductive substrate may be a long foil-like conductive sheet made from aluminum or an aluminum alloy, and dry etching the surface and forming the carbon film may be performed successively in the lengthwise direction of the long conductive sheet. According to this structure, dry etching the surface and forming the carbon film are performed successively with respect to the long conductive sheet so a sheet-shaped electrode collector having a carbon film can be obtained efficiently.

A second aspect of the invention relates to an apparatus for manufacturing an electrode collector covered with a carbon film. This apparatus includes a chamber, the inside of which can be reduced in pressure, in which are provided an etching portion that dry etches a surface of a conductive substrate and a carbon film forming portion that forms a carbon film on the etched substrate surface; a substrate retaining mechanism which is arranged in the chamber and retains the substrate; and a gas introducing mechanism which introduces a fluorine gas and an inert gas into the chamber, and is structured to create in the chamber a mixed gas atmosphere in which the fluorine gas and the inert gas are mixed at a predetermined molar ratio.

According to this structure, a group of processes, including the process of etching the surface of the conductive substrate and the process of forming the carbon film, are performed appropriately in the same chamber. In addition, the gas introducing mechanism is structured so as to create a mixed gas atmosphere, in which a fluorine gas and an inert gas are mixed at a predetermined molar ratio (volume ratio), in the chamber so the substrate surface etching rate (i.e., the etching speed) is able to be increased. That is, this structure enables a manufacturing apparatus to be provided which enables an electrode collector to be produced efficiently.

In the manufacturing apparatus according to this aspect, the carbon film may be made essentially of carbon, and a mixture ratio of the fluorine gas and the inert gas may be adjusted such that a fluorine content of the carbon film formed by the carbon film forming portion is no more than 15 at %. According to this structure, an electrode collector manufacturing apparatus can be provided which enables an increase in the resistance of the carbon film which is caused by fluorine being mixed in to be suppressed.

In the manufacturing apparatus according to the structure described above, a ratio of the fluorine gas in the mixed gas atmosphere in the chamber may be adjusted so as to be in a range between 1 mol % and 15 mol %, inclusive. This structure makes it possible to create a mixed gas atmosphere in which the fluorine content of the carbon film can be controlled so that it is no more than 15 at % in the chamber.

In the manufacturing apparatus according to the structure described above, the mixture ratio of the fluorine gas and the inert gas may be adjusted such that the fluorine content of the carbon film formed by the carbon film forming portion is no more than 10 at %. Also, the ratio of the fluorine gas in the mixed gas atmosphere in the chamber may be adjusted so as to be no less than 2 mol %.

In the manufacturing apparatus according to the structure described above, the fluorine gas may be one or more types of gas selected from the group consisting of CF4, SF6, and CHF3. A fluorine gas such as CF4 produces an extremely active species so a high etching rate can be realized by this structure.

In the manufacturing apparatus according to the structure described above, the substrate retaining mechanism may be structured to successively pass the substrate to the carbon film forming portion after the etching portion. According to this structure, an electrode collector in which a carbon film is formed on the substrate by passing the substrate through the chamber only once can be continuously obtained. Hence, a manufacturing apparatus capable of even more efficiently manufacturing the collector can be provided.

In the manufacturing apparatus according to the structure described above, the carbon film forming portion may be structured to deposit, via physical vapor deposition or chemical vapor deposition, carbon on the substrate.

A third aspect of the invention relates to an electrode collector manufactured by a method that includes arranging a conductive substrate in a chamber; reducing the pressure in the chamber, creating a mixed gas atmosphere of a fluorine gas and an inert gas in the chamber, and dry etching a surface of the arranged substrate in that atmosphere; and forming a carbon film made essentially of carbon on the surface of the dry etched substrate.

Also, a fourth aspect of the invention relates to an electrode collector manufactured by an apparatus that includes a chamber, the inside of which can be reduced in pressure, in which are provided an etching portion that dry etches a surface of a conductive substrate and a carbon film forming portion that forms a carbon film made essentially of carbon on the etched substrate surface; a substrate retaining mechanism which is arranged in the chamber and retains the substrate; and a gas introducing mechanism which introduces a fluorine gas and an inert gas into the chamber, and is structured to create in the chamber a mixed gas atmosphere in which the fluorine gas and the inert gas are mixed at a predetermined molar ratio.

A fifth aspect of the invention relates to a battery that includes the electrode collector according to the third or fourth aspect. This electrode collector includes at least one of an anode or a cathode. This structure enables even better battery performance to be displayed.

A sixth aspect of the invention relates to a vehicle that includes the battery according to the fifth aspect. In the vehicle, this battery is a power supply of the vehicle. According to this structure, a vehicle provided with a lightweight, high-output battery as a power supply can be obtained.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
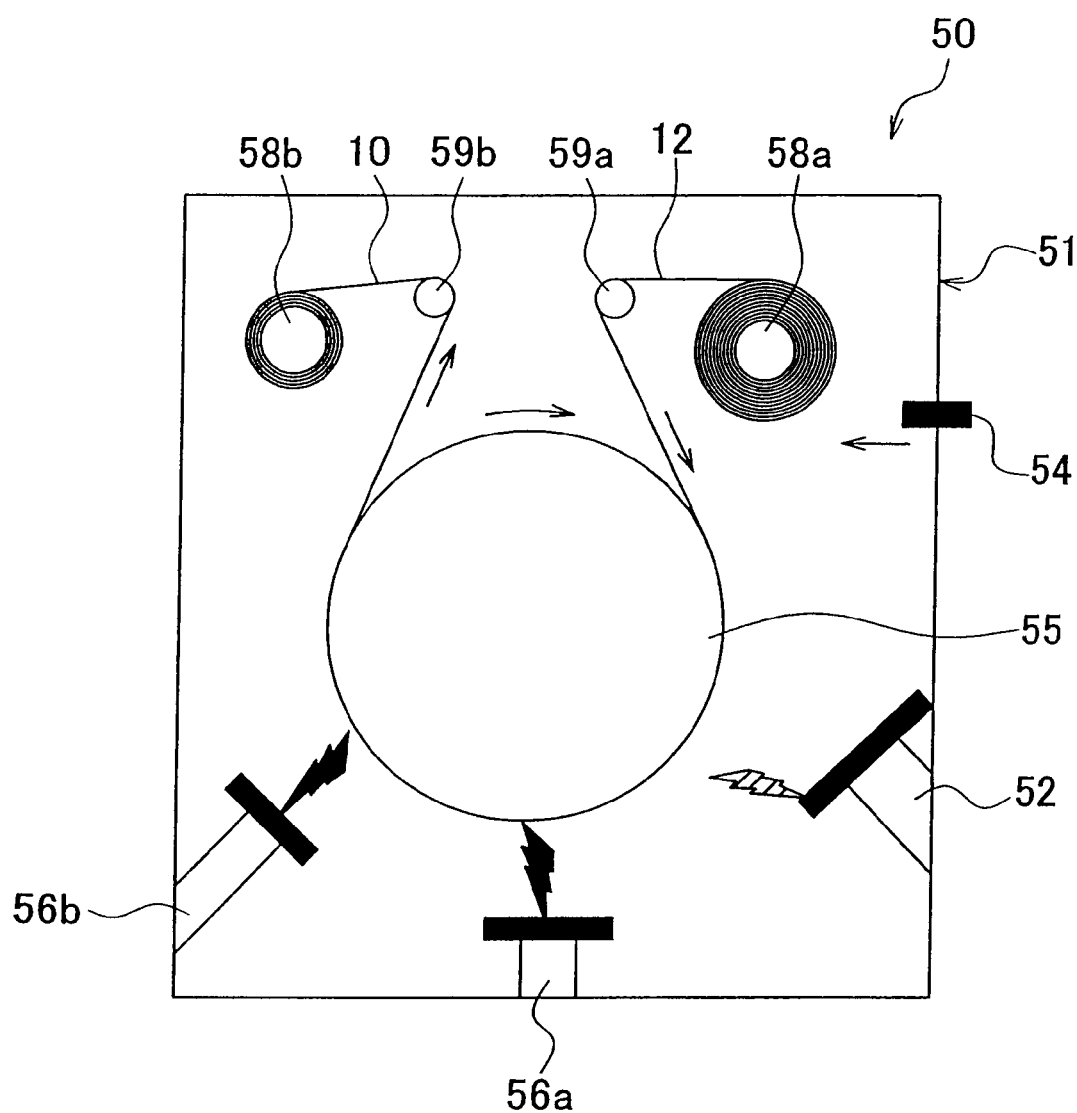
FIG. 1 is a schematic diagram showing a frame format of the overall structure of an apparatus according to an example embodiment of the invention.

Example embodiments of the present invention will be described in greater detail below with reference to the accompanying drawings. Members and portions in the drawings which have the same function will be denoted by like reference characters in the description. Incidentally, the dimensional relationships in the drawings (i.e., length, width, thickness, etc.) do not reflect the actual dimensional relationships. Also, topics which are not specifically mentioned in the specification but which are necessary to carry out the invention (such as the general technology related to the manufacturing method of an electrode active material, the method for adjusting the composition for forming an electrode composite layer, the structure and manufacturing method of a separator and an electrolyte, and the structure of a lithium secondary battery and other batteries, and the like) are understood to be design topics of those skilled in the art based on the related art in this field.

Although not intended to be particularly limiting, an example embodiment of the invention will hereinafter be described in detail with reference to FIG. 1 using, as an example, a case in which an anode collector (and anode) for a lithium secondary battery (such as a lithium-ion battery) is manufactured using a foil-like substrate of mainly aluminum (i.e., aluminum foil). FIG. 1 is a schematic diagram showing a frame format of the overall structure of an apparatus 50 according to this example embodiment.

The apparatus 50 according to this example embodiment is an apparatus used to manufacture an anode collector that is covered by a carbon film. The electrode collector manufacturing apparatus 50 includes a chamber 51 structured such that the pressure inside it can be reduced, a substrate retaining mechanism 55 that is arranged in the chamber 51 and retains a conductive substrate 12, and a gas introducing mechanism 54 that is connected to the chamber 51 and introduces fluorine gas and inert gas into the chamber 51. Also, an etching portion 52 that dry etches the substrate surface, and carbon film forming portions 56a and 56b that form a carbon film of essentially carbon on the etched substrate surface are provided in the chamber 51.

The conductive substrate 12 is a long foil-like conductive sheet made of aluminum or an aluminum alloy, for example. This conductive sheet 12 is pulled off of a supply roller 58a and undergoes a series of processes (i.e., an etching process by the etching portion 52 and the carbon film forming process by the carbon film forming portions 56a and 56b) on the substrate retaining mechanism 55, after which it is then rolled up by a receiving roll 58b. Tension rollers 59a and 59b which apply a constant tension to the conductive sheet 12 as it is conveyed are provided in the conveyer line of the conductive sheet 12.

The substrate retaining mechanism 55 is arranged inside the chamber 51 so as to retain the conductive sheet 12 in the chamber 51. In this example embodiment, the substrate retaining mechanism 55 successively passes the conductive sheet 12 to the carbon film forming portions 56a and 56b after the etching portion 52. That is, in this example embodiment, the long conductive sheet 12 is moved in one direction (i.e., clockwise in FIG. 1) by the substrate retaining mechanism 55 while the etching portion 52 and the carbon film forming portions 56a and 56b are operated such that the etching process and the carbon film forming process are successively carried out in the length direction of the conductive sheet 12. As a result, an electrode collector 10 in which a carbon film is formed on the substrate surface is able to be continuously obtained. Also, the effects from forming a highly conductive carbon film on the surface of the substrate are remarkable in an electrode collector (such as an anode collector) made of an aluminum or aluminum alloy substrate because aluminum or an aluminum alloy oxidizes easily.

The gas introducing mechanism 54 is structured such that the gas atmosphere and pressure inside the chamber can be adjusted as desired, and introduces a fluorine gas and an inert gas into the chamber 51. This gas introducing mechanism 54 is then able to create a mixed gas atmosphere, in which the fluorine gas and the inert gas are mixed at a predetermined molar ratio, within the chamber 51. Incidentally, in the example shown, the gas introducing mechanism 54 introduces the fluorine gas and the inert gas into the chamber 51 through the same nozzle, but the invention is not limited to this. For example, the gas introducing mechanism 54 may also be structured to introduce the fluorine gas and the inert gas through separate nozzles. Furthermore, when introducing the fluorine gas and the inert gas through separate nozzles, the gas introducing mechanism 54 may also be structured to selectively (locally) introduce the fluorine gas to an area around the etching portion 52 and selectively (locally) introduce the inert gas to an area around the carbon film forming portions 56a and 56b. In this way, it is possible to effectively inhibit the fluorine gas from mixing in with the carbon film, which will be described later, by disproportionately distributing the fluorine gas and the inert gas in the chamber 51. As a result, it is possible to easily adjust the fluorine concentration in the carbon film so that it is no more than 15 at %. Incidentally, "at %" in this specification refers to the atomic percentage (%). The atomic percentage of the fluorine (F) in the carbon film can be easily measured using the XPS analysis method or the EDS analysis method, for example.

The fluorine gas introduced into the chamber 51 is not particularly limited. For example, one or more types of fluorine gas selected from the group consisting of CF4, SF6, CHF, C2F6, C3F8, C4F6, C4F8, C1F3, F2, and COF2 may be used. Among these, CF4, SF6, and CHF3 gases produce an extremely active species (such as fluorine radicals and fluorine ions and the like).

The inert gas introduced into the chamber 51 is also not particularly limited. For example, an inert gas may be used which is inert with respect to carbon (C) and thus tends not to produce a reaction product with carbon. One example of such an inert gas is argon (Ar) gas.

The etching portion 52 is provided upstream in the path along which the conductive sheet 12 is conveyed, and is structured to dry etch the surface of the sheet (i.e., the substrate) 12 while the sheet 12 is being conveyed. The dry etching method may be a dry etching method according to related art and is not particularly limited. Some possible examples include a reactive ion etching method, a plasma etching method, and an ion beam etching method. For example, when a reactive ion etching method is used, the etching portion 52 can be structured to turn the mixed gas, which is a mixture of the inert gas and the fluorine gas introduced into the chamber 51, into plasma by plasma-generating means such as high frequency waves or the like, and bombard the substrate surface with radicals and ions produced from the plasma.

The carbon film forming portions 56a and 56b are provided downstream in the path along which the conductive sheet 12 is conveyed, and are structured to form a carbon film of essentially carbon on the substrate surface that has been etched by the etching portion 52. The method for forming the carbon film may be a film forming method according to related art and is not particularly limited. Some possible examples include a physical vapor deposition method (PVD method) such as the sputtering method or the ion plating (AIP) method and a chemical vapor deposition method (CVD method) such as the plasma CVD method. For example, when the sputtering method is used, the carbon film forming portions 56a and 56b can be structured so that a carbon film can be formed on the surface of the substrate by sputtering in a mixed gas atmosphere of a fluorine gas and an inert gas using carbon as the target. Incidentally, in this example embodiment, the carbon film forming portions 56a and 56b are arranged separated in two locations within the chamber 51. Arranging the carbon film forming portions 56a and 56b in a plurality of locations in the chamber in this way enables a carbon film of a desired thickness to be formed easily without reducing the speed at which the sheet 12 is conveyed.

Figure 2:
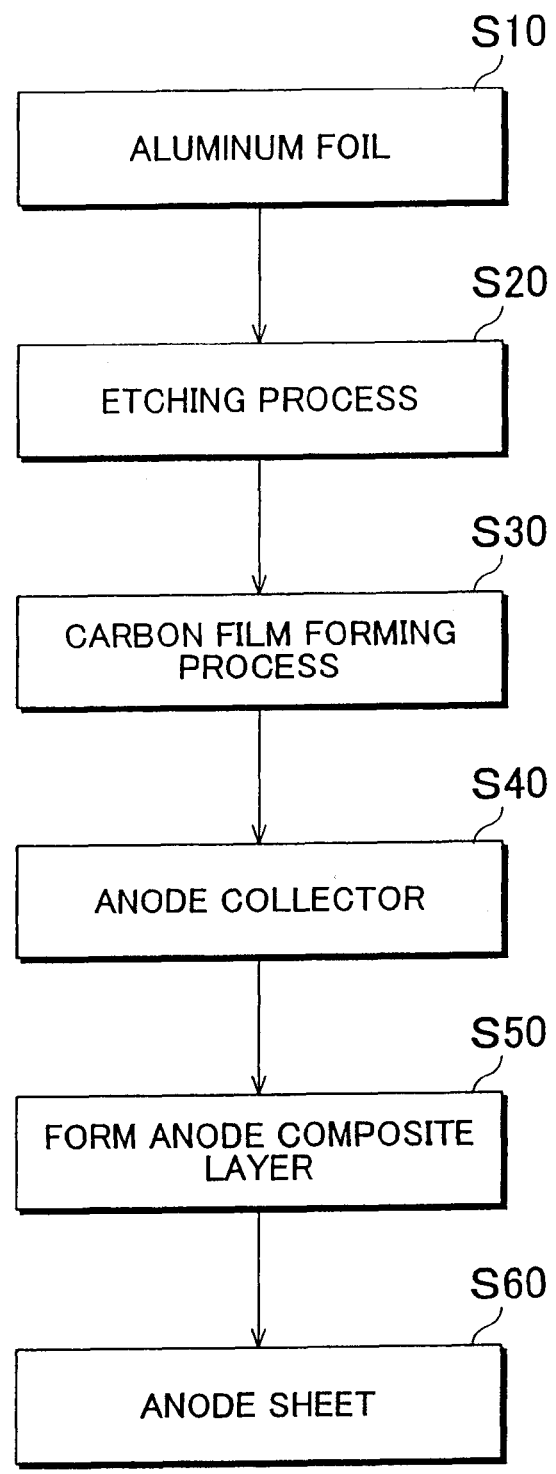
FIG. 2 is a flowchart illustrating the process flow in manufacturing an electrode according to the example embodiment.

Next, a method of manufacturing an anode collector and an anode using the electrode collector manufacturing apparatus 50 described above will be described with reference to the flowchart in FIG. 2 and the process sectional views in FIGS. 3A to 3D, in addition to FIG. 1. The manufacturing apparatus 50 uses a mixed gas that contains chlorofluorocarbon (CF4) gas and an inert gas such as argon (Ar) gas at a volume ratio of 5:95 as the clean gas for etching described above.

Figure 3A:
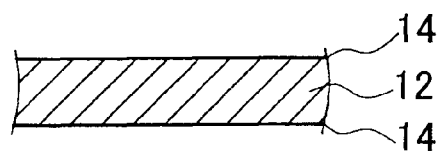
FIGS. 3A, 3B, 3C, and 3D are process sectional views showing the manufacturing process of the electrode according to the example embodiment.

First in step S10, the conductive substrate (i.e., the conductive sheet) 12, is arranged in the chamber 51. In this example embodiment, metal foil (in this case aluminum foil) approximately 10 μm to 30 μm thick, for example, is prepared as the conductive sheet 12, and pulled off of the supply roller 58a in the chamber 51 and set on the substrate retaining mechanism 55. Incidentally, because the surface 14 of the substrate (i.e., the aluminum foil) 12 oxidizes immediately upon exposure to air, it is covered by an oxide film (such as Al2O3) or grease or the like, as shown in FIG. 3A.

Figure 3B:

Next in step S20, the pressure in the chamber 51 is reduced and a mixed gas atmosphere of fluorine gas and inert gas is created in the chamber 51, and the surface of the arranged substrate is dry etched in this atmosphere. In this example embodiment, the mixed gas, which contains chlorofluorocarbon (CF4) gas and an inert gas such as argon (Ar) gas at a volume ratio of 5:95, is supplied into the chamber 51 after the pressure therein has been reduced (by evacuation, for example), and the surface of the conductive sheet (i.e., the substrate) 12 is etched in the mixed gas atmosphere. More specifically, the etching portion 52 is operated and plasma of the mixed gas (CF4/Ar gas) is produced above the conductive sheet (i.e., the substrate) 12, and the substrate surface is bombarded with radicals and ions produced from this plasma. As a result, the surface 14 of the substrate 12 is etched so the oxide film (such as Al2O3) or grease or the like covering the substrate surface can be removed, as shown in FIG. 3B.

At this time, in the apparatus 50 of this example embodiment, the mixed gas of CF4/Ar is supplied into the chamber 51 as the clean gas for etching so the etching rate can be increased compared with when just argon (Ar) gas is supplied. For example, in this example embodiment, CF4 gas is mixed in with the clean gas so not only is physical etching performed as a result of the bombardment by the active species (such as CF3 or F radicals and the like), but also chemical etching by the active species and the like can be performed simultaneously with that physical etching. As a result, the oxide film can be quickly (and efficiently) removed from the substrate surface.

Figure 3C:
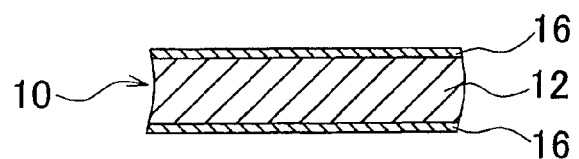

Next, in step S30, a carbon film 16 of essentially carbon is formed on the surface of the etched substrate 12. In this example embodiment, the carbon film forming portions 56a and 56b are operated and sputtering is performed using carbon as the target. The sputtering conditions can be set such that the mixed gas pressure is 0.1 Pa and the sputtering power is 400 W, for example. As a result, the carbon film 16 can be formed on the surface of the substrate 12, as shown in FIG. 3C.

The thus formed carbon film 16 may be a carbon film which at least contains no non-conductive organic polymeric material, or a carbon film that essentially contains no organic components. The carbon film 16 may also be a carbon film that essentially contains only carbon. The structure of the carbon film is not particularly limited. For example, the structure may be an amorphous structure, a graphite structure, or a combination of the two.

The thickness of the carbon film 16 is not particularly limited as long as it is thick enough to evenly cover the substrate. For example, the carbon film may be approximately 1 nm to 100 nm thick, though it may normally be approximately 3 nm to 20 nm (e.g., 3 nm to 10 nm) thick. If the carbon film is too thick, the energy density of the battery that is made using this electrode tends to decrease, and the strength of the carbon film tends to be insufficient. Incidentally, the thickness of the carbon film can be appropriately controlled by adjusting the conditions under which the carbon film is formed (such as the evaporation conditions).

Like the apparatus shown in FIG. 1, when the etching process and the carbon film forming process are performed in the same chamber 51, fluorine mixes in with the obtained carbon film 16 because the carbon film forming process is performed in a CF4/Ar gas atmosphere. In this case, the fluorine concentration in the carbon film may be controlled (adjusted) so that it is no more than 15 at (%) (and more preferably, no more than 10 at %). This makes it possible to suppress the resistance of the carbon film 16 from increasing which occurs as a result of the fluorine being mixed in.

Figure 4:
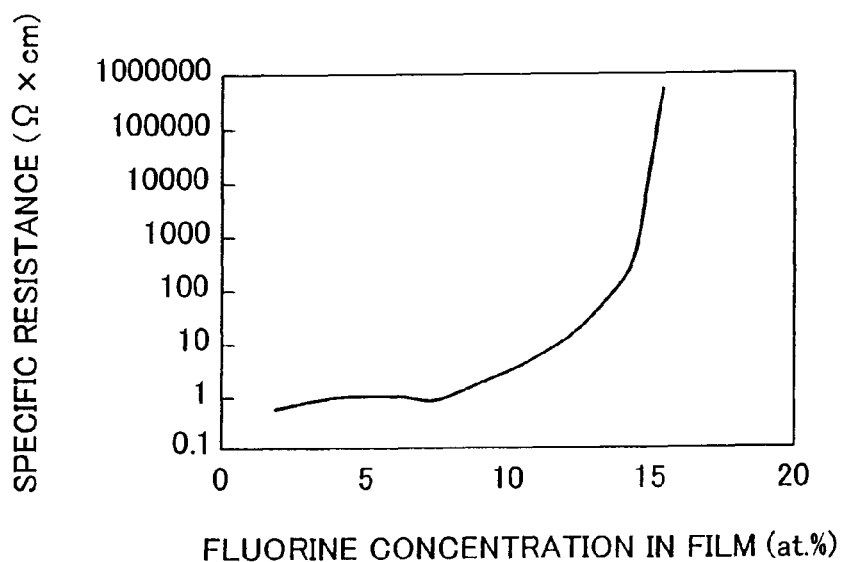
FIG. 4 is a graph showing the relationship between resistivity and fluorine concentration in a carbon film.

FIG. 4 shows the results obtained from examining the relationship between the resistivity ($\Omega \times cm$) and fluorine concentration (at %) in the carbon film. Upon examination of these results, the inventors of this application discovered that the resistivity of the carbon film rapidly increases when the fluorine concentration in the carbon film exceeds 15 at %. However, when the fluorine concentration in the carbon film is controlled (adjusted) so that it is no more than 15 at %, the increase in the resistivity of the carbon film can be suppressed. Moreover, if the fluorine concentration in the carbon film is controlled (adjusted) so that it is no more than 10 at %, the resistivity hardly increases at all and can be maintained at substantially the same level as that in a carbon film which does not contain fluorine. That is, by controlling (adjusting) the fluorine concentration in the carbon film 16 so that it is not more than 15 at % (and more preferably, not more than 10 at %), a high etching rate can be maintained during the etching process, while an increase in resistance of the carbon film that is caused by fluorine being mixed in can be suppressed in the carbon film forming process.

Figure 5:
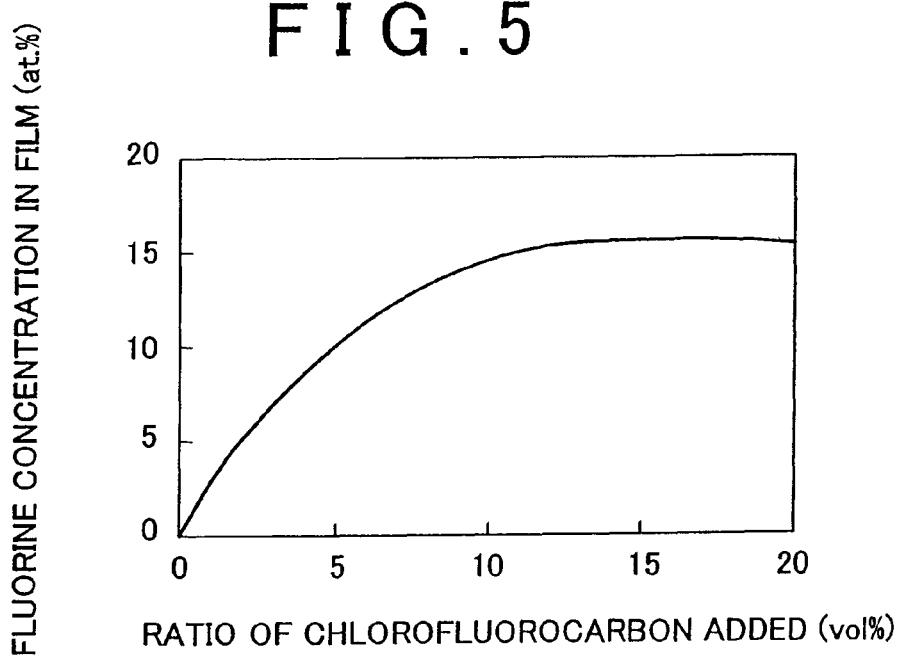
FIG. 5 is a graph showing the relationship between the concentration of added CF4 and the fluorine concentration in the carbon film.

Incidentally, the fluorine concentration in the carbon film can be easily controlled (adjusted) by appropriately adjusting the mixture ratio of the inert gas and the fluorine gas in the chamber 51. FIG. 5 is a graph showing the relationship between the concentration (vol %) of added chlorofluorocarbon ($CF4$) in the mixed gas and the fluorine concentration (at %) in the carbon film. As shown in the drawing, in order to control (adjust) the fluorine concentration in the carbon film so that it is no more than 15 at %, for example, the ratio of fluorine gas (such as $CF4$ gas) in the mixed gas atmosphere inside the chamber 51 is adjusted so that it is no more than 15 mol % (e.g., 1 to 15 mol %), and preferably no more than 10 mol % (e.g., 1 to 10 mol %). For example, the mixture ratio of the fluorine gas (such as $CF4$ gas) to the inert gas (Ar gas in this case) may be adjusted so as to be 1:99 to 15:85, and more preferably 1:99 to 10:90. More specifically, when controlling (adjusting) the fluorine gas concentration in the carbon film so that it is no more than 10 at %, the ratio of fluorine gas (i.e., $CF4$ gas) in the mixed gas atmosphere inside the chamber 51 may be adjusted so that it is no more than 5 mol % (e.g., 1 to 5 mol %). For example, the mixture ratio (the molar ratio or the volume ratio) of the fluorine gas (e.g., $CF4$ gas) to the inert gas (Ar gas in this case) may be adjusted so that it is 1:99 to 5:95. Also, when the concentration of fluorine gas (e.g., $CF4$ gas) in the mixed gas atmosphere is less than 1 mol %, the effect obtained by the fluorine gas mixture is low so the fluorine gas concentration in the mixed gas atmosphere may be 2 mol % or higher. For example, the mixture ratio of fluorine gas (e.g., $CF4$ gas) to inert gas (Ar gas in this case) may be adjusted so that it is 2:98 to 15:85, more preferably 2:98 to 10:90, and even more preferably 2:98 to 5:95. Incidentally, the relationship between the ratio of fluorine gas (such as $CF4$ gas) in the mixed gas atmosphere inside the chamber 51 and the fluorine concentration in the carbon film may differ depending on the structure (e.g., the flowrate of the supply gas, the pressure of the mixed gas atmosphere, and the sputtering power, and the like) of the electrode collector manufacturing apparatus used so the mixture ratio may actually fall slightly outside of the ranges of the preferable mixture ratios described above.

In this way, an electrode collector (the anode collector 10 in this example) in which the carbon film 16 is provided on the surface of the substrate (i.e., the aluminum foil) 12 can be obtained in step S40. Therefore, the steps described above can be understood to be the process for manufacturing the electrode collector 10.

According to the manufacturing method of this example embodiment, the oxide film and the like that naturally forms on the surface of the conductive substrate 12 is first removed through the etching process, and then the highly conductive carbon film 16 is formed on the surface of the substrate 12. Hence, an electrode collector having superior collecting performance with respect to the electrode composite layer (i.e., the layer containing electrode active material), for example, can be manufactured. In addition, performing the etching process with a mixed gas atmosphere of fluorine gas and inert gas inside the chamber 51 increases the substrate surface etching rate (i.e., etching speed). As a result, the oxide film and the like formed on the substrate surface can be removed quickly, thereby enabling the electrode collector 10 provided with a carbon film 16 suitable for the purpose of the invention to be efficiently produced.

Furthermore, in the structure of the apparatus shown in FIG. 1, the etching process and the carbon film forming process are performed in the same chamber 51. Therefore, the electrode collector 10 in which the carbon film 16 is formed on the substrate 12 can be obtained by the substrate 12 passing through the chamber 51 only once, which further improves productivity of the electrode collector 10 provided with the carbon film 16. In addition, in this example embodiment, the conductive substrate 12 is a long foil-like conductive sheet 12 formed of aluminum, and the etching process and the carbon film forming process are performed successively in the lengthwise direction of the long conductive sheet. According to this structure, the etching process and the carbon film forming process are performed successively on the long conductive sheet 12 so the sheet-shaped electrode collector provided with the carbon film 16 can be obtained even more efficiently.

Moreover, in the structure of the apparatus of the example embodiment, the carbon film forming process is performed in a mixed gas atmosphere of fluorine gas and inert gas so fluorine may be mixed in with the obtained carbon film 16. Even in this case, however, an increase in resistance of the carbon film caused by fluorine being mixed in can be suppressed so a highly conductive carbon film can be formed on the substrate surface by controlling the conditions under which the carbon film is formed (for example, adjusting the ratio of fluorine gas in the mixed gas atmosphere inside the chamber so that it is no more than 15 mol %) so that the fluorine concentration in the carbon film is no more than 15 at % (and more preferably, no more than 10 at %).

Continuing on, the process for manufacturing an electrode 100 using the electrode collector 10 in which the carbon film 16 is formed on the surface in this way will now be described referring back to FIG. 2. That is, in step S50, an anode composite layer 20 is formed on the electrode collector 10 obtained in the manner described above. In this example embodiment, first an electrode composite in the form of a paste, into which has been mixed a powder of anode active material and another component that forms an anode composite layer (such as conductive material or a binder), which is used as necessary, that have been dispersed (e.g., dissolved) in an appropriate dispersion medium, is adjusted and then applied onto the anode collector 10.

The dispersion medium may be water or a mixed solvent having water as its main component, or a non-aqueous organic medium (such as N-methylpyrrolidone). Also, the pasty electrode mixture is applied by coating a predetermined amount of it on the anode collector 10 at a uniform thickness using an appropriate application device (such as a slit coater, a die coater, or a comma coater), for example.

Figure 3D:
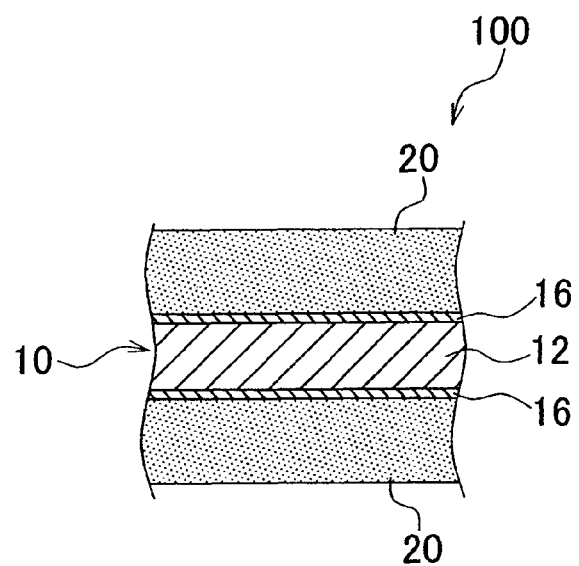

Next, the dispersion medium in the pasty electrode composite is removed by drying (at 70 to 200° C., for example) the pasty electrode composite using appropriate drying means. Then, as shown in FIG. 3D, the anode composite layer 20 that includes the anode active material is formed by removing the dispersion medium from the pasty electrode member.

In this way, the anode sheet (i.e., an anode) 100 in which the anode composite layer is formed on the surface of the anode collector 10 can be obtained in step S60. Incidentally, after drying, the thickness and density of the anode composite layer 20 can be appropriately adjusted through an appropriate press process (such as a roll press process) as necessary.

Figure 7:
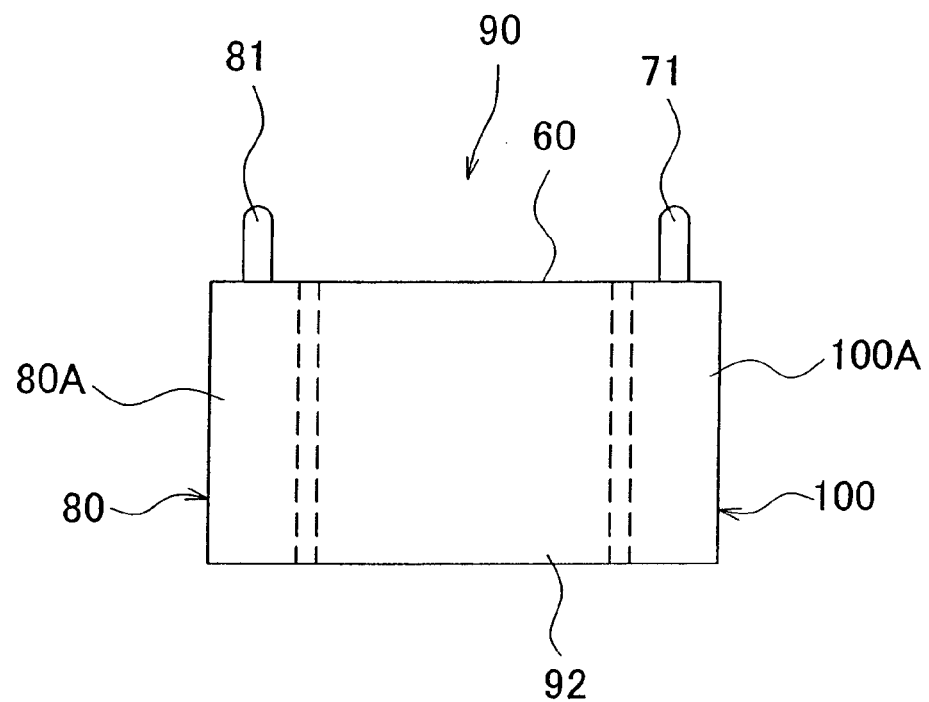
FIG. 7 is a front view showing a frame format of an example of a wound electrode body.
Figure 8:
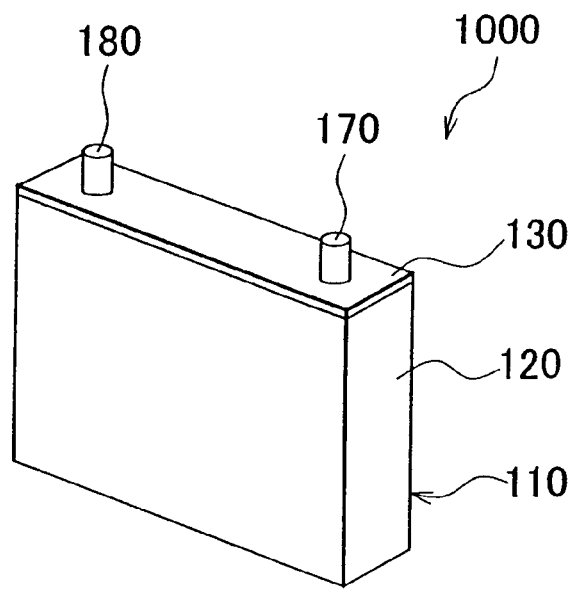
FIG. 8 is a perspective view showing a frame format of a secondary battery according to the example embodiment.

Next, an example embodiment of a lithium secondary battery made using the anode (i.e., the anode sheet) 100 manufactured by using the method according to the invention will be described with reference to the frame format views shown in FIGS. 7 and 8. The method for manufacturing this lithium secondary battery uses the anode collector manufactured according to the method described above as the anode collector.

As shown in the drawings, a lithium ion battery 1000 according to this example embodiment includes a case 110 made of metal (this case may alternatively be made of resin or laminated film). This case (outer container) has a flat, rectangular parallelepiped case main body 120, the upper end of which is open, and a lid 130 that closes off the open portion. A positive terminal 170 that is electrically connected to the anode of a wound electrode body 90, and a negative terminal 180 that is electrically connected to a cathode of the wound electrode body 90 are provided on the upper surface (i.e., the lid 130) of the case 110. The flat wound electrode body 90, which is made by laminating and rolling a long sheet-shaped anode (i.e., an anode sheet) 100 and a long sheet-shaped cathode (i.e., a cathode sheet) 80 together with two long sheet-shaped separators (i.e., separator sheets), and then squashing the obtained rolled body from the side to flatten it out, is housed inside the case 110.

The anode sheet 100 and the cathode sheet 80 each have a structure in which an electrode composite layer, which has electrode active material as its main component, is provided on both sides of a long sheet-like electrode collector. On one end in the width direction of the electrode sheets 100 and 80 is formed a portion where there is no electrode composite layer formed on either side. During the lamination process, the anode sheet 100 and the cathode sheet 80 are overlapped while being slightly offset in the width direction so that portion of the anode sheet 100 where there is no anode composite layer and the portion of the cathode sheet 80 where there is no cathode composite layer protrude from both sides in the width direction of the separator 60. As a result, the portions of the anode sheet 100 and the cathode sheet 80 where there is no electrode composite layer protrude to the outside of a rolled core portion 92 (that is, a portion where the portion of the anode sheet 100 where the anode composite layer is formed and the portion of the cathode sheet 80 where the cathode composite layer is formed and the two separator sheets 60 are tightly rolled together). An anode lead terminal 71 is provided on the anode protruding portion (i.e., the portion where the anode composite layer is not formed) 100A and a cathode lead terminal 81 is provided on the cathode side protruding portion (i.e., the portion where the cathode composite layer is not formed) 80A. The anode lead terminal 71 is electrically connected to the positive terminal 170 and the cathode lead terminal 81 is electrically connected to the negative terminal 180.

Incidentally, the constituent elements other than the anode sheet 100 that form the wound electrode body 90 are not particularly limited and may be the same as they are in the electrode body of the lithium ion battery according to the related art. For example, the cathode sheet 80 may be formed by applying a cathode composite layer, the main component of which is cathode active material for a lithium battery, to a long cathode collector. Copper foil or other metal foil suitable for use as a cathode may be suitably used for the cathode collector. The cathode active material that can be used is not limited to the one or two or more types of material used in lithium ion batteries. Some examples include carbon material such as graphite carbon or amorphous carbon, a lithium-transition metal composite oxide (such as a lithium-titanium composite oxide), and a lithium-transient metal complex nitride. For example, a suitable cathode sheet 80 can be obtained by forming a cathode composite layer, the main component of which is graphite, (e.g., 98 percent by mass of graphite, 1 percent by mass of styrene-butadiene rubber, and 1 percent by mass of carboxymethylcellulose) in the usual manner on a predetermined region of a surface of a piece of long copper foil that serves as the collector.

Also, one example of the separator sheet 60 used between the anode sheet 100 and the cathode sheet 80 is a porous polyolefin resin separator sheet. For example, a composite resin (e.g., a polyolefin such as polyethylene) porous separator sheet that is approximately 5 to 30 μm (e.g., 25 μm) thick can be used. Incidentally, when a solid electrolyte or a gel-like electrolyte is used as the electrolyte, a separator may be unnecessary (that is, in this case, the electrolyte itself is able to function as the separator).

Next, the wound electrode body 90 is placed in the case main body 120 through the open portion in the upper end of the main body 120 and electrolyte solution containing a suitable electrolyte is arranged (poured) into the case main body 120. The electrolyte is a lithium salt such as $LiPF_6$, for example. For example, an appropriate amount (such as 1 M concentration) of lithium salt such as $LiPF_6$ can be dissolved in a nonaqueous electrolyte solution such as a mixed solvent of diethyl carbonate and ethylene carbonate (at a mass ratio of 1:1).

Then the open portion is sealed off by securing the lid 130 in place by welding or the like, thus completing assembly of the lithium ion battery 1000 according to this example embodiment. The process of sealing the case 110 and the process of arranging (pouring) the electrolyte may be the same as the methods used to manufacture the lithium ion battery according to the related art, and do not define the invention. In this way, the construction of the lithium ion battery 1000 according to the example embodiment is completed.

The thus constructed battery displays excellent battery performance because it is provided with the electrode collector 10 in which the surface of the substrate 10 is covered by the carbon film 16 and which has excellent collecting performance with respect to the electrode composite layer 20 (i.e., the layer that includes the electrode active material). A battery with excellent output characteristics can be provided by constructing a battery using the electrode collector, for example.

The following tests were conducted as examples to confirm that a battery (such as a lithium secondary battery) with excellent output characteristics can be constructed by making a battery using an anode collector manufactured according to the manufacturing method of the invention.

That is, an anode collector was manufactured using aluminum foil as the substrate, then etching the surface of that substrate, and forming a carbon film of a predetermined thickness (film thickness: 10 nm) on the etched surface. The etching process and the carbon film forming process were performed using a common ECR sputtering apparatus. The etching and carbon film forming conditions were as follows. A mixed gas including CF4 and Ar at a volume ratio (molar ratio) of 5:95 was introduced (at a gas flowrate of 20 ml/min) at a constant pressure of 0.1 Pa, and solid carbon was used as the target with a sputtering power of 400 W. Incidentally, the fluorine concentration in the carbon film formed in this way was approximately 10 at % when measured by the EDS analysis method.

Next, an evaluation battery (i.e., a lithium secondary battery) was made using the manufactured anode collector, and the discharge characteristics of the battery were evaluated. More specifically, an anode sheet in which an anode material layer is provided on both sides of an anode collector was made by adjusting an anode material paste by dispersing 89% by mass of lithium-nickel oxide as an anode active material, 5% by mass of acetylene black as an anode conductive agent, 5% by mass of PTFE (polytetrafluoroethylene) as an anode binder, and 1% by mass of CMC (carboxymethylcellulose) as a thickener into a suitable solvent, and applying this paste to the top of the carbon film on the anode collector. Meanwhile, a cathode sheet in which a cathode material layer is provided on both sides of a cathode collector was made by adjusting a cathode material paste by dispersing 98% by mass of graphite, 1% by mass of SBR (styrene-butadiene rubber) as a cathode binder, and 1% by mass of CMC as a thickener into a suitable solvent, and applying this paste to the cathode collector (copper foil). Then, a wound electrode body is made by rolling the anode sheet and the cathode sheet with two separator sheets (i.e., porous polypropylene) in between. Next, the wound electrode body obtained in this way is placed in a battery case (18650 type cell). Next, a test lithium secondary battery (an example) is constructed by pouring electrolyte solution into the battery case through a filler hole and sealing the filler hole. For the electrolyte solution, 50 ml of a 1:1 (mass ratio) mixed solvent of ethylene carbonate and diethyl carbonate into which approximately 1 M of LiPF6 has been dissolved is used. Incidentally, for the comparative example, a lithium secondary battery was made using an anode collector having no carbon film. Other than using the anode collector having no carbon film, the lithium secondary battery of the comparative example was the same as the battery of the example embodiment.

Figure 6A:
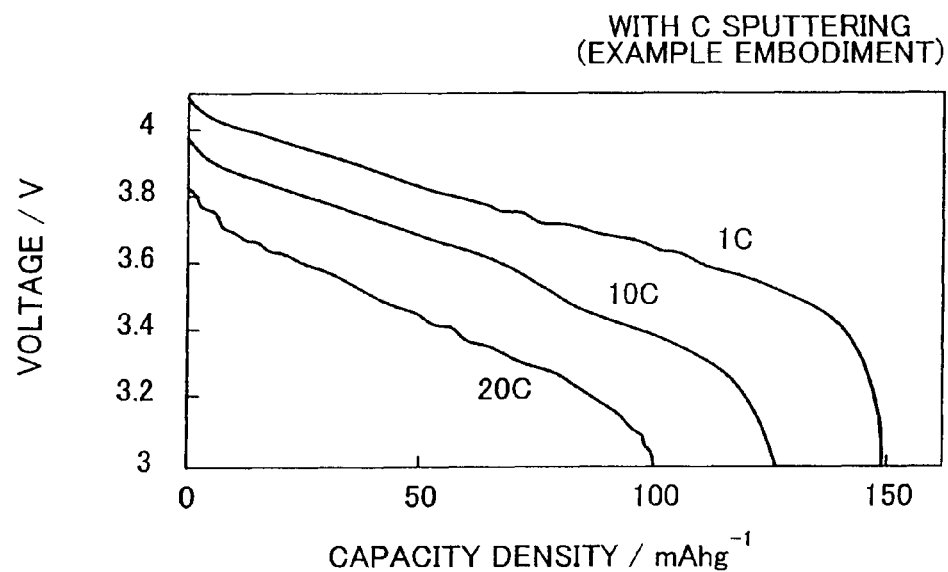
FIG. 6A is a graph showing the discharge characteristics of a battery that uses an anode collector of the example embodiment.
Figure 6B:
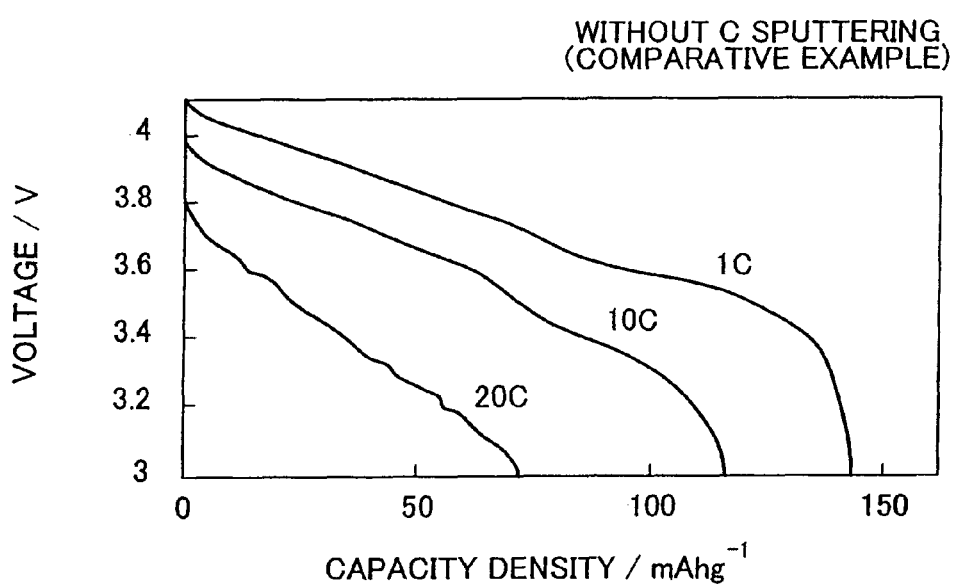
FIG. 6B is a graph showing the discharge characteristics of a battery that uses an anode collector of a comparative example.

Next, a discharge characteristics test was performed on the test batteries of the comparative example and the example embodiment described above, and the discharge rate characteristics were evaluated. The conditions of the discharge characteristics test were such that the measurement temperature was 25° C. and the current density was 1 C, 1.5 mA/g. The results are shown in FIGS. 6A and 6B. Incidentally, the horizontal axis in the drawings represents the capacity density (mAh/g) and the vertical axis in the drawings represents the voltage (V).

As shown in FIG. 6B, the battery (comparative example) made using the anode collector having no carbon film indicates a discharge capacity of close to 150 mAh/g, and maintains a discharge capacity of approximately 120 mAh/g even at a 10 C discharge rate. However, at a 20 C discharge rate, which is an extremely high current density, the capacity falls drastically, with the discharge capacity dropping to around 70 mAh/g.

In contrast, as shown in FIG. 6A, the battery (example embodiment) using the anode collector manufactured according to the manufacturing method of the invention indicates a discharge capacity of close to 150 mAh/g, which is the same as the comparative example, and maintains a discharge capacity of around 125 mAh/g even at a 10 C discharge rate. Furthermore, even at a 20 C discharge rate, which is an extremely high current density, there is no large drop in capacity. Instead, the discharge capacity of 100 mAg/h is able to be maintained. That is, at a 20 C discharge rate, the battery output characteristics can be drastically improved. This confirmed that a battery with superior output characteristics (high rate characteristics) can be made using an anode collector manufactured according to the manufacturing method of the invention.

Moreover, the following experiment was conducted to confirm that the substrate surface etching rate is able to be increased by creating a mixed gas atmosphere, in which a fluorine gas and an inert gas are mixed, inside the chamber 51. That is, etching was performed using a common ECR sputtering apparatus on aluminum foil on which an oxide film approximately 5 nm thick was formed. The time it took to remove the oxide film from the aluminum foil was measured and the etching rate was calculated. The etching conditions were as follows. A mixed gas that includes CF4 and Ar at a volume ratio of 5:95 was introduced (at a gas flowrate of 20 ml/min) at a constant pressure of 0.1 Pa, and with a sputtering power of 200 W at 400 MHz. The results showed that when etching was performed in a CF4/Ar mixed gas atmosphere, the etching rate was approximately 185 nm/min so it was confirmed that an etching rate of 20 nm/min to 40 nm/min, which enables the etching process to be performed in-line suitable for continuous manufacture, is able to be achieved.

Although the invention has been described in terms of the foregoing example embodiments, it is not limited to these example embodiments. That is, various modifications are of course possible.

For example, the dry etching method by the etching portion is not limited to the reactive ion etching method described above. For example, a plasma etching method or an ion beam etching method or the like may also be employed. When a plasma etching method is used, for example, the etching portion can be structured to etch the substrate surface by a chemical reaction with activated atoms (i.e., radicals) in the plasma from the mixed gas of inert gas and fluorine gas introduced into the chamber.

When the ion beam etching is used, for example, the etching portion can be structured to physically etch the substrate surface by sputtering, by bombarding the substrate surface with a beam of inert gas (such as Ar) ions in a mixed gas atmosphere of an inert gas and fluorine gas introduced into the chamber. In this case as well, the substrate surface etching rate can be increased if there is fluorine gas around the substrate that is bombarded with ions. Alternatively, the etching portion may be structured to etch the substrate surface by bombarding it with a beam of ions of a mixed gas of an inert gas and a fluorine gas.

Moreover, in the example described above, the electrode collector described is mainly an anode collector. However, the structure of the invention may be applied regardless of whether the electrode is an anode or a cathode. That is, the invention also provides a method for manufacturing a cathode collector having a carbon film, as well as an apparatus for manufacturing the cathode collector. When the electrode collector is a cathode collector, according to the manufacturing method of the example embodiment, the surface of the conductive substrate (such as copper foil) is first washed by etching and then a highly conductive carbon film is formed on the surface of the substrate (e.g., the copper foil). This enables a cathode that adheres well to a cathode composite layer (i.e., a layer that includes cathode active material), for example, to be manufactured efficiently.

Figure 9:
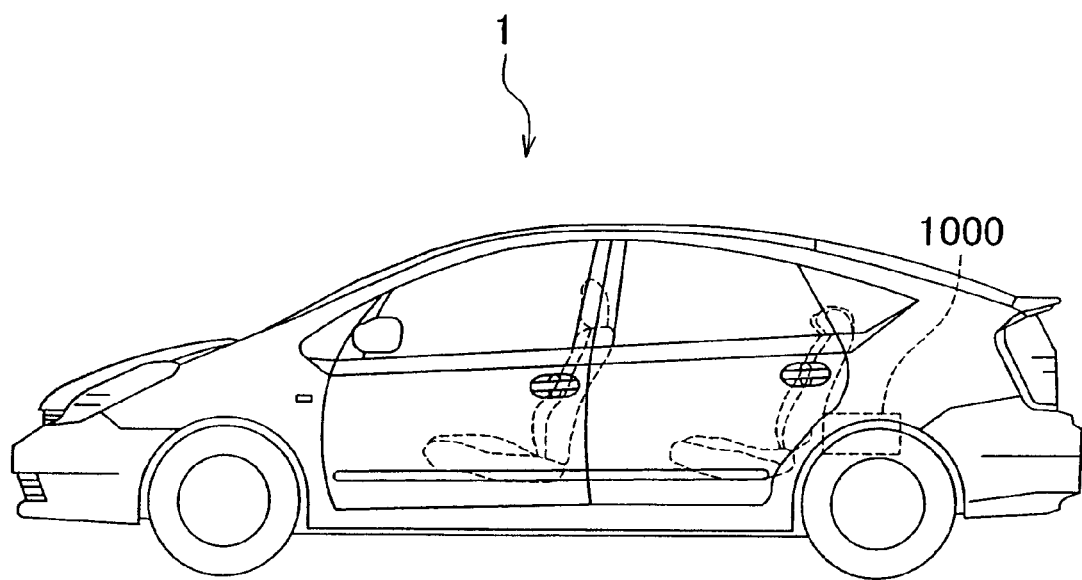
FIG. 9 is a side view showing a frame format of a vehicle (automobile) provided with the secondary battery of the example embodiment.

Incidentally, as described above, the battery (such as a lithium ion battery) according to this example embodiment displays superb battery characteristics (such as at least one of low internal resistance, high output characteristics, and high durability) and stable quality, which enables it to be particularly well suited for use as a power supply for a motor (i.e., an electric motor) onboard a vehicle such as an automobile. Therefore, the invention provides a vehicle (such as an automobile, and more particularly, a vehicle provided with an electric motor such as a hybrid vehicle, an electric vehicle, or a fuel cell vehicle) 1 which uses the battery (such as a battery pack formed of a plurality of batteries connected together in series) 1000 as a power supply, as shown in the frame format view in FIG. 9.

The invention claimed is:

1. A method of manufacturing an electrode collector covered with a carbon film, comprising:
    arranging a conductive substrate in a chamber;
    reducing the pressure in the chamber;
    creating a mixed gas atmosphere of a fluorine containing gas and an inert gas in the chamber;
    dry etching a surface of the arranged substrate in that atmosphere; and
    forming a carbon film on the surface of the dry etched substrate,
    wherein dry etching the surface of the substrate and forming the carbon film are performed in the same chamber, and
    wherein the mixture ratio of the fluorine containing gas and the inert gas in the chamber is adjusted such that the fluorine concentration in the carbon film obtained by forming the carbon film is no more than 10 at %.

2. The manufacturing method according to claim 1, wherein the carbon film is made essentially of carbon.

3. The manufacturing method according to claim 1, wherein a ratio of the fluorine containing gas in the mixed gas atmosphere in the chamber is adjusted so as to be in a range between and inclusive of 1 mol % and 15 mol %.

4. The manufacturing method according to claim 3, wherein the ratio of the fluorine containing gas in the mixed gas atmosphere in the chamber is adjusted so as to be no less than 2 mol %.

5. The manufacturing method according to claim 1, wherein the fluorine containing gas is one or more types of gas selected from the group consisting of $CF_4$, $SF_6$, and $CHF_3$.

6. The manufacturing method according to claim 1, wherein forming the carbon film is performed by depositing, via physical vapor deposition or chemical vapor deposition, carbon on the substrate.

7. The manufacturing method according to claim 1, wherein:
    the conductive substrate is a long foil-like conductive sheet made from aluminum or an aluminum alloy; and
    dry etching the surface and forming the carbon film are performed successively in the lengthwise direction of the long conductive sheet.

8. An electrode collector manufactured by using the manufacturing method according to claim 1.

9. A battery comprising the electrode collector according to claim 8, wherein the electrode collector includes at least one of an anode or a cathode.

10. A vehicle comprising the battery according to claim 9, wherein the battery is a power supply of the vehicle.

* * * * *